US010037086B2

(12) United States Patent
Skogö et al.

(10) Patent No.: US 10,037,086 B2
(45) Date of Patent: Jul. 31, 2018

(54) PORTABLE DEVICE

(71) Applicant: TOBII AB, Danderyd (SE)

(72) Inventors: Mårten Skogö, Danderyd (SE); John Elvesjö, Danderyd (SE); Jan-Erik Lundkvist, Danderyd (SE); Per Lundberg, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 15/639,764

(22) Filed: Jun. 30, 2017

(65) Prior Publication Data

US 2017/0371420 A1 Dec. 28, 2017

Related U.S. Application Data

(63) Continuation-in-part of application No. 15/259,538, filed on Sep. 8, 2016, now Pat. No. 9,772,690, which
(Continued)

(30) Foreign Application Priority Data

Nov. 4, 2011 (EP) .................... 11187816

(51) Int. Cl.
*G06F 3/01* (2006.01)
*G06F 1/16* (2006.01)

(52) U.S. Cl.
CPC ............ *G06F 3/017* (2013.01); *G06F 1/1662* (2013.01); *G06F 1/1681* (2013.01);
(Continued)

(58) Field of Classification Search
CPC ...... G06F 3/013; G06F 1/1686; G06F 1/3215; G06T 11/60; A61B 3/113
See application file for complete search history.

(56) References Cited

U.S. PATENT DOCUMENTS 6,530,784 B1 3/2003 Yim
6,542,721 B2 4/2003 Boesen
(Continued)

FOREIGN PATENT DOCUMENTS

CN 101382836 A 3/2009
CN 102221891 A 10/2011
(Continued)

*Primary Examiner* — Abbas Abdulselam
(74) *Attorney, Agent, or Firm* — Kilpatrick Townsend & Stockton LLP

(57) ABSTRACT

A portable computing device is disclosed which may include a base element, a lid element, a first motion sensor, a second motion sensor, a processor, and an eye tracking system. The first motion sensor may be disposed in the base element. The second motion sensor may be disposed in the lid element. The processor may be configured to control the first motion sensor to detect first motion information, control the second motion sensor to detect second motion information; and determine final motion information based at least in part on the first motion information and the second motion information. The eye tracking system may be configured to determine a gaze position of a user based at least in part on the final motion information, wherein the processor is further configured to execute one or more control processes based at least in part on the determined gaze position meeting a predetermined condition.

25 Claims, 7 Drawing Sheets

Related U.S. Application Data is a continuation of application No. 14/355,978, filed as application No. PCT/EP2012/069445 on Oct. 2, 2012, now Pat. No. 9,465,415.

(60) Provisional application No. 61/556,505, filed on Nov. 7, 2011.

(52) U.S. Cl.
CPC .......... G06F 1/1684 (2013.01); G06F 1/1686 (2013.01); G06F 3/011 (2013.01); G06F 3/013 (2013.01)

(56) References Cited

U.S. PATENT DOCUMENTS

| | | | |
|---|---|---|---|
| 8,619,273 B2 | 12/2013 | Mukai | |
| 8,629,784 B2* | 1/2014 | Szczerba | G01S 13/723 340/438 |
| 8,836,777 B2* | 9/2014 | Mehra | G06F 3/013 345/7 |
| 9,465,415 B2 | 10/2016 | Skogoe et al. | |
| 9,772,690 B2 | 9/2017 | Skogoe et al. | |
| 2002/0036617 A1 | 3/2002 | Pryor | |
| 2005/0050686 A1* | 3/2005 | Kurokawa | G06F 1/1618 16/354 |
| 2005/0110887 A1 | 5/2005 | Shin et al. | |
| 2009/0102744 A1 | 4/2009 | Ram | |
| 2009/0244820 A1 | 10/2009 | Kusaka et al. | |
| 2010/0156781 A1 | 6/2010 | Fahn | |
| 2012/0084676 A1* | 4/2012 | de Paz | G06F 1/1616 715/761 |
| 2012/0147047 A1* | 6/2012 | Kim | G09G 5/00 345/649 |
| 2014/0132508 A1* | 5/2014 | Hodge | G06F 3/013 345/156 |
| 2014/0300541 A1 | 10/2014 | Skogoe et al. | |
| 2016/0116980 A1* | 4/2016 | George-Svahn | G06F 3/013 345/168 |

FOREIGN PATENT DOCUMENTS

| | | |
|---|---|---|
| JP | 2002-374434 A | 12/2002 |
| JP | 3778490 B2 | 5/2006 |

* cited by examiner

PORTABLE DEVICE

CROSS-REFERENCE TO RELATED APPLICATIONS

This application is a continuation-in-part of U.S. patent application Ser. No. 15/259,538, filed Sep. 8, 2016, which is a continuation of U.S. Pat. No. 9,465,415, filed May 2, 2014, which is a national stage entry of PCT/EP2012/069445, filed Oct. 2, 2012, which claims priority to U.S. Prov. Pat. App. No. 61/556,505, filed Nov. 7, 2011, and European Pat. App. No. 11187816.1, filed Nov. 4, 2011.

BACKGROUND OF THE INVENTION

Embodiments of the present invention relate generally to automatic tracking of distinctive features of users operating electronic equipment.

Laptops with integrated eye-trackers are known. Unfortunately, existing solutions are comparatively bulky, and therefore the laptop design becomes relatively thick, i.e., in closed/inactive mode, the laptop has a rather high profile. Naturally, this is undesired because portable devices, such as laptops, in general should be as compact and slim as possible. Nevertheless, this bulkiness can sometimes be an advantage. Because the optical remote sensing systems of today's eye-trackers at times consume relatively large amounts of power, substantial thermal power dissipation must be available. A larger volume is more capable of dissipating this heat than a smaller volume. Therefore, the trend of each generation of laptop becoming thinner than the previous generation is problematic because the available space for thermal dissipation in the lid of the laptop becomes more and more limited. This places severe constraints on which components that can be used to implement eye-trackers and similar devices.

U.S. Pat. Pub. No. 2005/0110887 shows an example of a mobile communication terminal with a main body and a foldable display body. A camera is positioned in a hinge unit which connects the display body to the main body. The camera is rotatable around the hinge axis to register images of the user as well as subjects/objects in front of the user. Thus, versatile camera function is attained. However, since the camera is freely rotatable relative to both the main body and the display body it may be complicated to use the camera for many purposes, such as for eye-tracking.

In the light of the above, embodiments of the invention provide a compact and yet thermally and power-efficient portable device that is equipped with an optical remote sensing system for eye/gaze tracking, gesture detection, facial feature tracking, and/or user identification through face or iris recognition or hand gesture detection.

BRIEF SUMMARY OF THE INVENTION

One object of various embodiments herein is to mitigate the above problems and provide a slim portable device with an integrated optical remote sensing system for eye/gaze tracking and/or gesture tracking.

In some embodiments, the above object is achieved by a first laptop or other device, wherein the first laptop or other device has a first part which includes a recess. The recess is arranged relative to a position of the optical remote sensing system such that, when the laptop lid is in the closed position, the optical remote sensing system is at least partly disposed in the recess.

This portable device is advantageous because it enables an overall slim design to be combined with an adequate cooling volume for the optical remote sensing system. This is a desirable feature in any portable device, including: laptops, note books, ultrabooks, tablets with keyboards, personal digital assistants, and smartphones.

According to one embodiment, the recess is co-located with a first piece of the hinge means. The optical remote sensing system is further disposed in a projection of the second part where a second piece of the hinge means is located. The first and second pieces of the hinge means represent a pivot axis via which the first and second parts of the portable device are interconnected. Such an integration of the optical remote sensing system in the hinge means is desirable because it provides a volume sufficient to ensure adequate cooling of the optical remote sensing system while the tracking functionality can be integrated in an essentially indiscernible manner into the portable device.

According to another embodiment, the first and second parts of the portable device are interconnected via the hinge means along a proximal side of the second part. The optical remote sensing system is here disposed in a projection extending along a distal side of the second part, where the distal side is opposite to the proximal side. In a laptop implementation, this means that the optical remote sensing system is located above the screen when the device is arranged in the open/active mode. Such a positioning is especially advantageous if a user's gestures are to be interpreted by the optical remote sensing system.

According to yet another embodiment, the second essentially flat surface of the second part includes a display unit (e.g., an LCD screen) configured to present information to the user. It is further preferable if the first essentially flat surface of the first part includes a keyboard configured to receive input commands from the user. Hence, the optical remote sensing system is included in the same part as the display unit.

According to still another embodiment, the optical remote sensing system is arranged such that a view angle thereof has a fixed spatial relation to the display unit irrespective of an orientation of the second part relative to the first part. Of course, this is desirable because thereby it is fairly straightforward to determine the user's point of regard on the display unit based on data registered by the optical remote sensing system.

According to a further embodiment, the first part is a base element and the second part is a lid element. During operation, the base element is configured to be placed on an essentially flat sup-porting surface (e.g., a desk) while the lid element is positioned upright, so that its essentially flat inner surface (typically containing a display unit) is visible to the user.

According to other embodiments, the optical remote sensing system includes an image registering unit (e.g., a still camera or a video camera), and preferably, at least one illuminator configured to illuminate the user. A combined camera-and-illuminator is generally advantageous for cost efficiency. In eye-tracker implementations it is also desirable that one or more light sources be arranged close to the optical axis of the image registering unit. Embodiments of the invention, however, are likewise applicable to designs where the light source and the image registering unit are separated from one another. In any case, it is generally preferable that the optical remote sensing system includes an optical filter, which is arranged in front of an illuminator and/or an image registering unit therein, and which optical filter is configured to block visible light however is transparent to near-infrared (NIR) light. Namely, as will be discussed below, NIR light is desirable, whereas visible light may disturb the user.

According to still another embodiment, at least one of the at least one illuminator is configured to produce structured light, which when registered by the image registering unit, causes resulting data to be created, which resulting data are adapted for generating a depth map of the user. This is advantageous both when interpreting gestures and in eye-tracking, for instance when selecting a relevant image segment to process.

According to yet another embodiment, at least one of the at least one illuminator is configured to produce near-infrared light. Namely, this type of light is relatively uncomplicated to detect by a camera, however invisible to the human eye.

In some embodiments, at least one of the at least one illuminator is configured to produce a light beam whose direction is controllable, so that a varying position of the user can be tracked. Directional optical illuminators are advantageous relative to static ditto because, at each point in time, the directional illuminator only illuminates a fraction of a surface inside a volume within which the subject moves. Thereby, power is conserved corresponding to the size of the non-illuminated surface that would otherwise have been illuminated.

According to another embodiment, at least one of the at least one illuminator is based on LED (Light Emitting Diode) technology. Namely, LEDs represent energy-efficient, compact and reliable light sources.

According to still another embodiment, at least one of the at least one illuminator is configured to produce coherent light. Coherent light sources (e.g., lasers) are desirable, since such a light source may be combined with diffractive optical elements to transform a light beam into a desired spatial pattern. Thus, the illumination can be controlled very efficiently, for instance to follow a position of the user.

According to a further embodiment, the optical remote sensing system includes an eye tracker configured to repeatedly determine a position of at least one eye of the user and/or repeatedly determine a point of regard of the user relative to the portable device. Thereby, it is possible to generate input commands to a laptop based on the user's ocular activity.

Thus, in one embodiment, a portable computing device is provided. The portable computing device may include a base element, a lid element, a first motion sensor disposed in the base element, a second motion sensor disposed in the lid element, a processor, and an eye tracking system. The processor may be configured to control the first motion sensor to detect first motion information, control the second motion sensor to detect second motion information, and determine final motion information based at least in part on the first motion information and the second motion information. The eye tracking system may be configured to determine a gaze position of a user based at least in part on the final motion information. The processor may be further configured to execute one or more control processes based at least in part on the determined gaze position meeting a predetermined condition.

In another embodiment, a method for controlling an eye tracking system of a portable device is provided. The method may include detecting first motion information with at least a first motion sensor disposed in a first part of a portable device. The method may also include detecting second motion information with at least a second motion sensor disposed in a second part of the portable device. The method may further include determining final motion information based on the first motion information and the second motion information. The method may moreover include determining a gaze position of a user based on at least in part of the final motion information. The method may furthermore include executing one or more control processes based at least in part on the determined gaze position meeting a predetermined condition.

In another embodiment, a non-transitory computer readable medium having stored thereon a program for controlling an eye tracking system of a portable device is provided. The program may include a step of detecting first motion information with at least a first motion sensor disposed in a first part of a portable device. The program may also include a step of detecting second motion information with at least a second motion sensor disposed in a second part of the portable device. The program may further include a step of determining final motion information based on the first motion information and the second motion information. The program may additionally include determining a gaze position of a user based on at least in part of the final motion information. The program may moreover include executing one or more control processes based at least in part on the determined gaze position meeting a predetermined condition.

BRIEF DESCRIPTION OF THE DRAWINGS

Embodiments of the present invention are described in conjunction with the appended figures.

DETAILED DESCRIPTION OF THE INVENTION

Figure 1A:
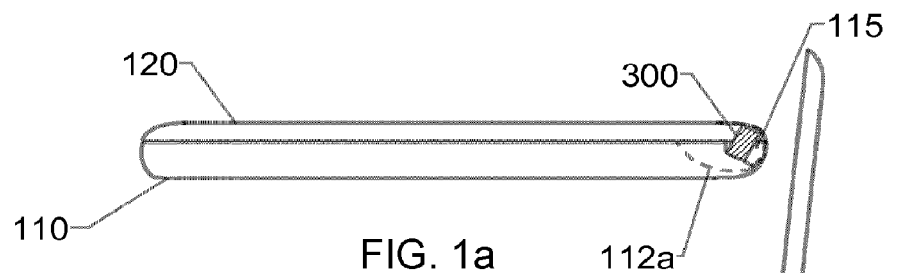
FIG. 1A and FIG. 1B show side views of a portable device according to a first embodiment of the invention.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "computer readable medium" or "machine readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a computer or machine readable medium. A processor(s) may perform the necessary tasks. The terms "comprises," "comprising," "includes," "including," and other terms herein specify the presence of stated features, integers, steps, or components. However, these terms do not preclude the presence or addition of one or more additional features, integers, steps, and/or components or groups thereof.

Figure 1B:
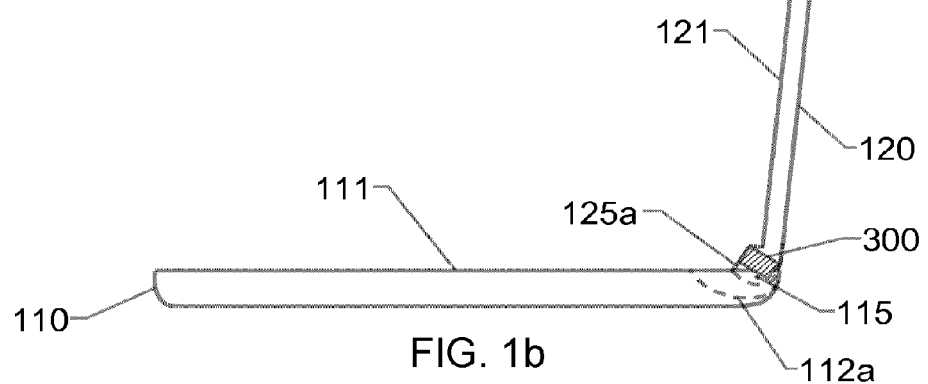

We refer initially to FIGS. 1A and 1B, which show side views of a portable device including a remote optical sensing system 300 according to a first embodiment of the invention. For convenience, the portable device is here embodied as a laptop. However, according to various embodiments of the invention, the portable device may equally well be represented by an alternative electronic device, such as a note book, an ultrabook, a tablet with a keyboard, a personal digital assistant (PDA) or a smartphone.

The proposed portable device includes a first part 110 (here represented by a laptop base element) and a second part 120 (here represented by a laptop lid element). The second part 120, in turn, includes the optical remote sensing system 300. As is common in laptops, the second part 120 is pivotably attached to the first part 110 via a hinge means 115, such that the portable device may be arranged in an open and a closed position respectively. FIG. 1A illustrates the closed position (predominantly used when the device is inactive) and FIG. 1B illustrates the open position (the typical position when the device is activated). The optical remote sensing system 300 is configured to track at least one distinctive feature of a user of the portable device when the device is active and arranged in the open position. The at least one distinctive feature may be an eye, a facial feature and/or a limb of the user, such as his/her hand. Thereby, the optical remote sensing system 300 may be used for eye-, gaze, gesture and/or facial feature tracking and/or user identification through face or iris recognition or hand gesture detection.

The first and second parts 110 and 120 have a respective essentially flat inner surface 111 and 121. When the portable device is arranged in the closed position, the essentially flat inner surfaces 111 and 121 are parallel and face one another, as can be seen in FIG. 1A. The inner surfaces 111 and 121 are not entirely flat. Namely, for example, the first part 110 has a recess 112a in the essentially flat inner surface 111, which recess 112a is arranged relative to a position of the optical remote sensing system 300 in the second part 120, such that, in the closed position, the first part 110 receives a projection 125a of the second part 120, which projection 125a includes the optical remote sensing system 300. As a result, the optical remote sensing system 300 is at least partly contained in the recess 112a when the portable device is arranged in the closed position (i.e., normally the inactive mode).

The first essentially flat surface 111 of the first part 110 preferably also includes a keyboard configured to receive input commands from the user. Moreover, the second essentially flat surface 121 of the second part 120 preferably includes a display unit 122 (see FIG. 5) configured to present information to the user, such as text, graphics, images and/or video.

Figure 2:
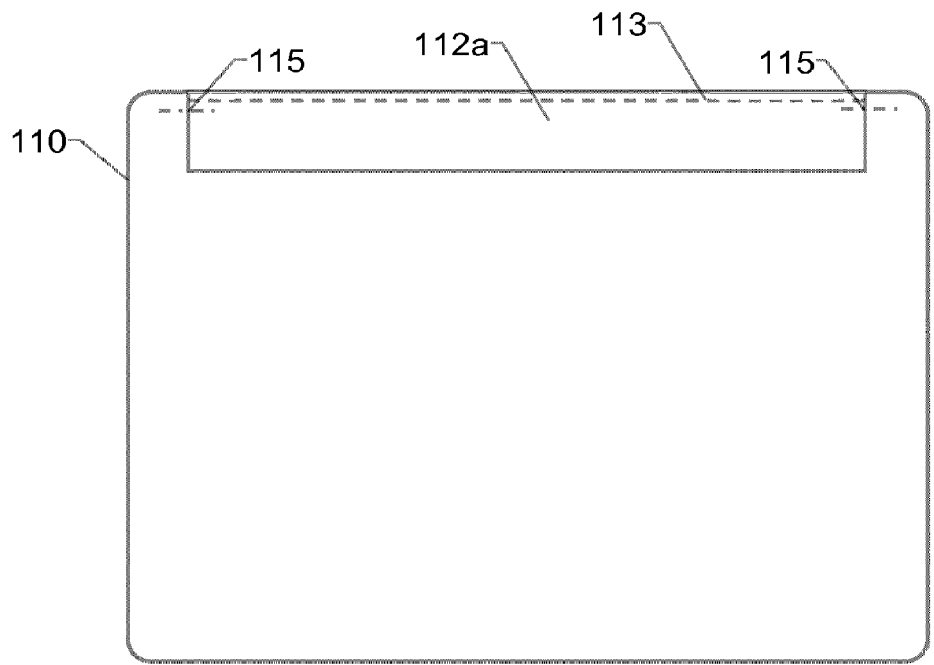
FIG. 2 shows a top view of a first part of the portable device in FIGS. 1A and 1B.

FIG. 2 shows a top view of the first part 110 of the portable device in FIGS. 1A and 1B. The recess 112a preferably extends between a pair of hinge means 115 (symbolically illustrated with dashed lines), which in turn are arranged in proximity to the portable device's sides. Above the hinge means 115, the second part 120 preferably extends to a full width of the first part 110 (not shown).

As is apparent from FIGS. 1A, 1B and 2, the recess 112a is co-located with a first piece of the hinge means 115, say a female piece. A second piece of the hinge means 115, say a male piece, is located on the projection 125a of the second part 120. The first and second pieces of the hinge means 115 represent a pivot axis via which the first and second parts 110 and 120 are interconnected. Hence, as is shown in FIG.

1A (and in further detail in FIG. 5), when the portable device is closed, the projection 125a is configured to swing down into the recess 112a, so that the recess 112a houses the optical remote sensing system 300, at least partly. It is technically possible that the recess 112a is represented by a complete, or partial, cut-out in the first part 110. The dashed line 113 in FIG. 2 shows an example of where an edge of such a partial cut-out may be located. Nevertheless, it is desirable that a bottom part of the recess 112a covers at least any optical filter in front of an illuminator and/or an image registering unit in the optical remote sensing system 300 when the portable device is closed. For optimal compactness of the portable device, the recess 112a should be as deep as possible; i.e., in closed mode, as much as possible of the optical remote sensing system 300 should be contained in the recess 112a (or 112b, see below). This means that the bottom of the recess 112a may be a 2 mm thick tongue covering a front-most side of the optical remote sensing system 300 when the portable device is closed.

Figure 3A:
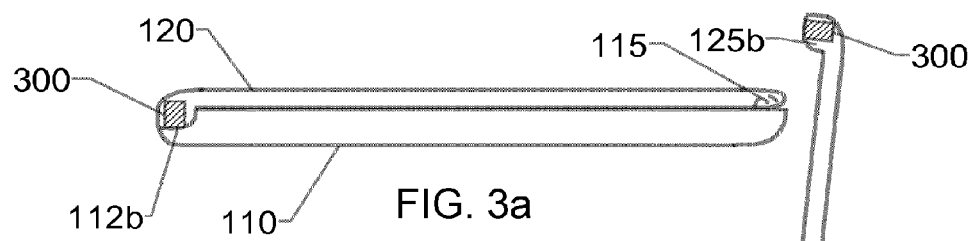
FIG. 3A, and FIG. 3B show side views of a portable device according to a second embodiment of the invention.
Figure 3B:
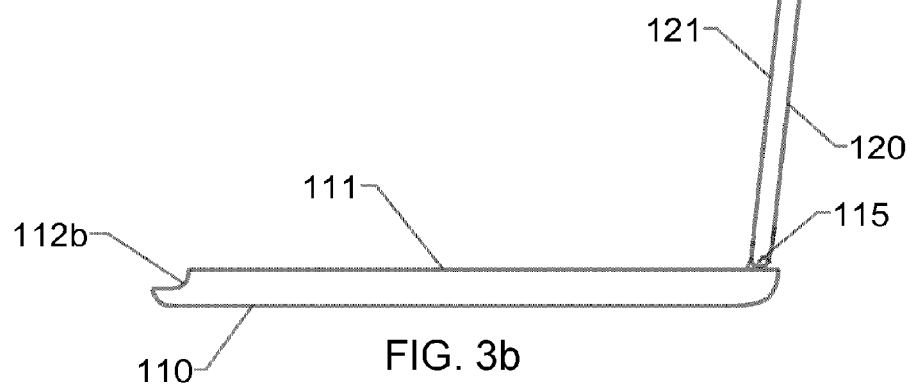
Figure 4:
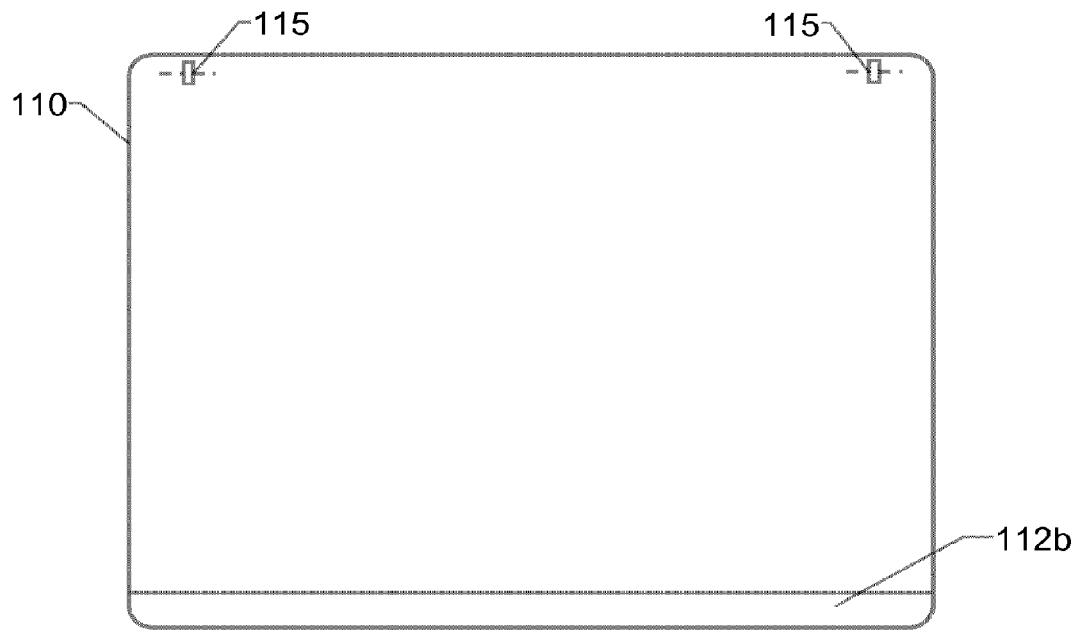
FIG. 4 shows a top view of a first part of the portable device in FIGS. 3A and 3B.

FIGS. 3A and 3B show side views of a portable device including an optical remote sensing system 300 according to a second embodiment of the invention. FIG. 4 shows a top view of the first part 110 of the portable device in FIGS. 3A and 3B. In FIGS. 3A, 3B and 4 all elements having labels which also occur in FIGS. 1A, 1B and/or 2 represent the same entities as those described above with reference to FIGS. 1A, 1B and/or 2.

Again, the portable device has first and second parts 110 and 120 that are pivotably attached to one another, such that the portable device may be arranged in an open and a closed position respectively. In this case, however, the optical remote sensing system 300 is not co-located with the hinge means 115. Instead, the optical remote sensing system 300 is disposed in a projection 125b extending along a distal side of the second part 120, whereas the hinge means 115 are arranged along a proximal side of the second part 120, which proximal and distal sides are opposite to one another.

Figure 5:
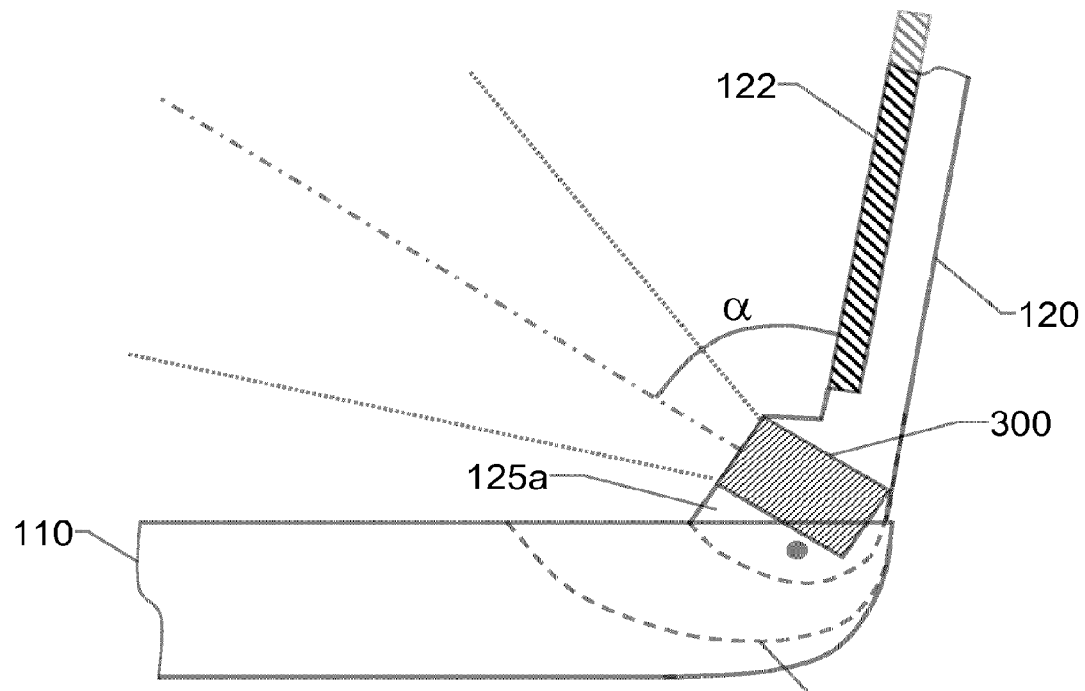
FIG. 5 illustrates, in further detail, the first embodiment of the invention depicted in FIGS. 1A, 1B, and 2.

FIG. 5 illustrates in further detail the first embodiment of the invention depicted in FIGS. 1A, 1B and 2. Here, the optical remote sensing system 300 is arranged in the projection 125a of the second part 120, which is co-located with the hinge means 115. Preferably, the optical remote sensing system 300 is further arranged such that a view angle α thereof has a fixed spatial relation to the display unit 122 irrespective of an orientation of the second part 120 relative to the first part 110. The ideal view angle α depends on the specific characteristics of an image registering unit included in the optical remote sensing system 300. However, preferably α has a value in the range 50° to 65°, more preferably 56° to 60°, and most preferably α=58°. Namely, thereby the risk that the user's hands block the optical remote sensing system 300 is relatively low, and at the same time, an acceptable angle towards the user's face is attained for the most commonly used inclinations of the second part 120 relative to the first part 110 in the active mode. Hence, for example the user's point of regard on the display unit 122 can be determined repeatedly based on data from an eye-tracker of the optical remote sensing system 300.

Figure 6:
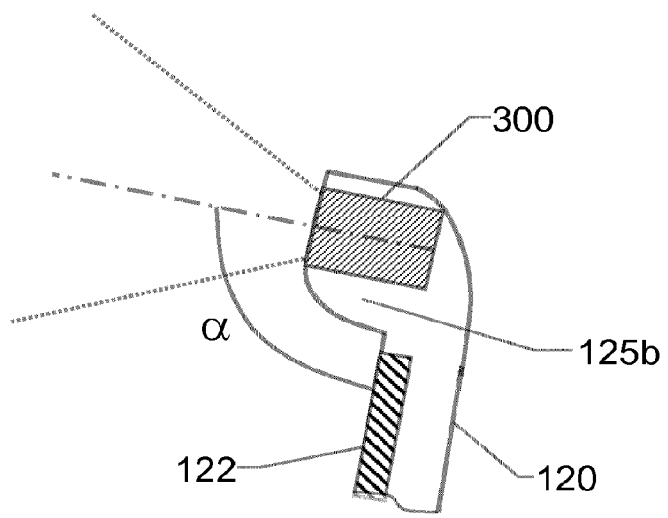
FIG. 6 illustrates, in further detail, the second embodiment of the invention depicted in FIGS. 3A, 3B, and 4.

FIG. 6 illustrates in further detail the second embodiment of the invention depicted in FIGS. 3A, 3B and 4. Here, the optical remote sensing system 300 is arranged in the projection 125b of the second part 120, which extends along a side of the second part that is opposite to the side where the hinge means 115 are located. Also in this embodiment, the optical remote sensing system 300 is preferably arranged such that a view angle α thereof has a fixed spatial relation to the display unit 122 irrespective of an orientation of the second part 120 relative to the first part 110. Nevertheless, in this case, the view angle α preferably has a value in the range 80° to 100°, and most preferably α=90°. Thus, the optical remote sensing system 300 may be efficiently used for eye- and/or gaze tracking as well as for interpretation of facial expressions and/or gestures.

Irrespective of whether the optical remote sensing system 300 is co-located with the hinge means 115 (as in FIG. 5), or arranged in proximity to a distal side thereof (as in FIG. 6), it is generally desirable that an illuminator and/or an image registering unit of the optical remote sensing system 300 is covered by an optical filter, which, preferably, is configured to block visible light while permitting NIR light to pass through.

Additionally, regardless of the location of the optical remote sensing system 300, according to some embodiments of the invention, the optical remote sensing system 300 includes an image registering unit and at least one illuminator configured to illuminate the user. The image registering unit, in turn, may contain a still and/or a video camera configured to capture image data representing the user of the portable device, such as images of his/her eyes.

It is further advantageous if at least one of the at least one illuminator is configured to produce structured light, which when reflected against the user and registered by the image registering unit causes resulting data to be created, which resulting data are adapted for generating a depth map of the user. Depth maps are advantageous both when interpreting gestures and during eye-tracking, for instance when selecting a relevant image segment to process.

Moreover, one or more of the at least one illuminator may be configured to produce (NIR) light. NIR light is advantageous because it is relatively uncomplicated to detect by a camera and because it is invisible to the human eye. Thus, NIR light does not disturb the user.

It is further advantageous if one or more of the at least one illuminator is configured to produce a light beam whose direction is controllable to track a varying position of the user. If at least one of the at least one illuminator is configured to produce coherent light, diffractive optical elements (DOE) may be used to transform the light beam into a desired spatial pattern. Thus, the illumination can be controlled very efficiently, for instance to follow a position of the user.

Alternatively, or as a complement, at least one of the at least one illuminator may be based on LED technology. LEDs are desirable light sources since they are energy-efficient, compact and reliable.

In a third embodiment, a portable device having two portions connected via a hinge, such as laptop, is capable of opening to a large angle (e.g., over 120 degrees) with respect to the surface of base element (shown as the first part 110). Some convertible laptops are even equipped with a rotatable display, such that when the laptop is in the open position, the display portion can be rotated, twisted and tilted. Where the portable device is equipped with an eye tracker, the eye tracker is normally mounted towards the base of the display portion, and a large open angle, or extremely tilted, twisted, or rotated display presents a problem in that the eye tracker (shown as optical remote sensing system 300) may not be able to achieve optimal eye tracking performance.

For the purpose of this document, the term "open angle" is intended to refer to the angle representing the orientation of the first part 110 to the second part 120. In other words, the degree of openness of a laptop or similar portable device.

The performance of the eye tracker, such as precision or accuracy of eye tracking, may be severely affected as the gaze positions may be too close to the edge of the second part 120 or even out of the gaze tracking area on the display unit 122 when, for example, the open angle is too large. Therefore, there is a need to determine the open angle of the portable device and ultimately determine the orientation of the lid element (shown as the second part 120) and dynamically control and/or recalibrate the eye tracker based on this and/or any other system events associated with the performance of the eye tracker. The exact position and/or orientation of the second part 120 in relation to the optical remote sensing system 300 may be stored in any form of computer readable storage of the portable device. This may allow for improved power efficiency and more accurate and precise eye tracking performance.

Figure 7:
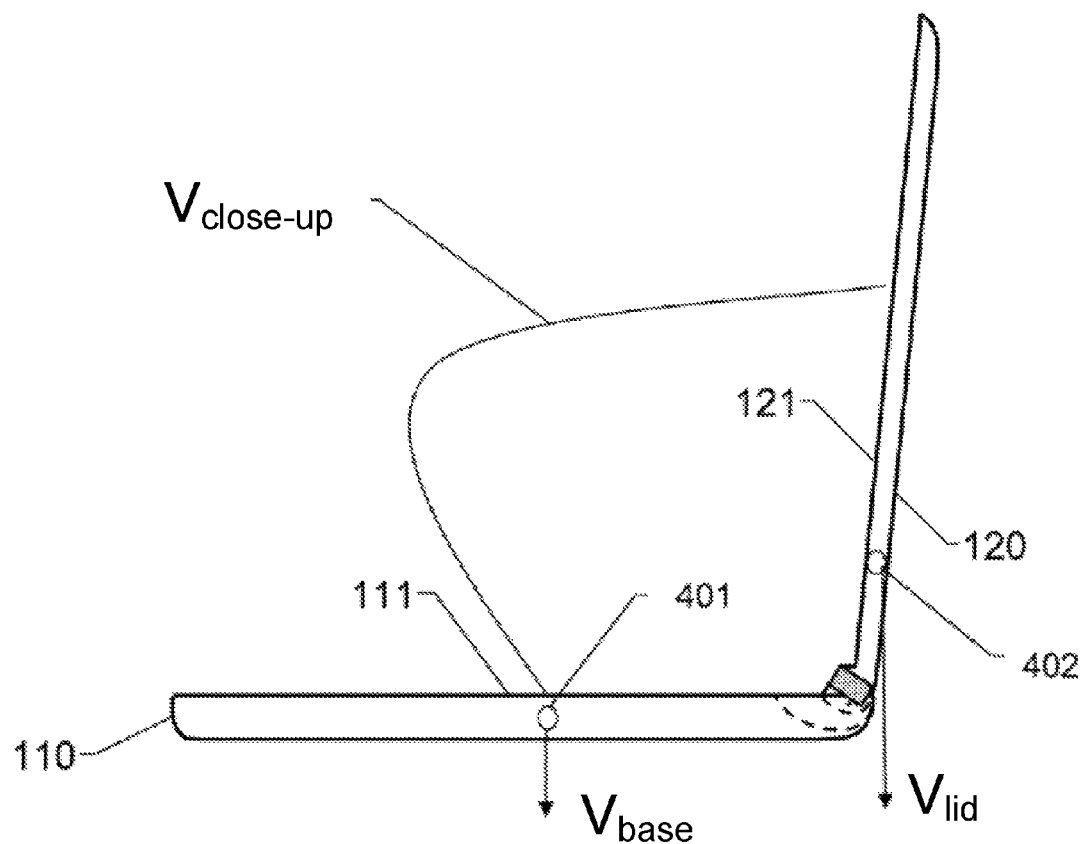
FIG. 7 illustrates a side view of a portable device including at least two motion sensors according to a third embodiment of the invention.

FIG. 7 show views of a portable device including at least two motion sensors 401, 402 according to a third embodiment of the invention. In the third embodiment, the portable device includes two or more motion sensors equipped in the second part 120 (for example a laptop lid element) and the first part 110 (for example a laptop base element) respectively. The number of motion sensors may be more than two, with different configurations according to their placement accordingly.

For this non-limiting example, the motion sensor may be any kind of Inertial Measurement Unit (IMU) or Microelectromechanical (MEMS) system, such as an accelerometer, gyroscope, and/or magnetometer. The motion sensor can also be an inertial measurement module coupled with a plurality of the aforementioned motion sensors or integrated as a System-in-Package (SiP).

The accelerometer may be an electromechanical device that measures acceleration forces, as would be readily understood by a person of skill in the art. These forces may be static, like the constant force of gravity in a case where the accelerometer is not moved or vibrated for a period of time, or they could be dynamic—caused by moving or vibrating the accelerometer. The accelerometer may be of different types, such as a digital accelerometer or analog accelerometer. The specifications of the accelerometers, such as number of measurement axes, output range, sensitivity and dynamic range, can be manually set by a user or automatically set according to the usage of the portable device.

The gyroscope (or gyro sensor) senses angular velocity from the Coriolis force applied to a vibrating object. And the vibrating object may be the second part 120, the first part 110, or may be the portable device in general. The types of gyroscopes are also not limited, and may include Tuning Fork Gyroscopes, Vibrating-Wheel Gyroscopes, Wine Glass Resonator Gyroscopes or Foucault Pendulum Gyroscopes. The gyroscopes may be a stand-alone chip module communicatively coupled to the system bus of the circuitry of the portable device or may be printed onto the circuit board (e.g., motherboard) of the portable device using photolithography. Again, the specification of the gyroscopes, such as measurement range, number of sensing axes, linearity or nonlinearity, shock survivability, angular random walk (ARW), bias, bias drift and bias instability, can be manually set by a user or automatically set according to the usage of the portable device.

Alternatively, the motion sensor of 401 and/or 402 may be a composite module coupled with one or more accelerometers and/or one or more gyroscopes. Then the measurement of acceleration force(s) and angular velocity is possible.

The one or more motion sensors in the second part 120 may be preferably placed at the bottom or substantially close to the bottom of the second part 120, where the bottom is the edge of the second part 120 most closely located to the first part 110, which means the one or more motion sensors may be substantially close to the hinge means 115. "Substantially close" in this context means proximate to the hinge and distal to the opposite edge of the second part 120. In some embodiments, this may mean the one or more motion sensors may be located below the screen of the second part 120. It is advantageous to have such placement to minimize risk of low determination accuracy caused by accidental or unwanted vibration of the second part 120, which may affect the precision of angle determination (details will be described in the following paragraphs). The second part 120 of a portable device (e.g., laptop) may be of such limited thickness that minor vibrations may cause shaking of second part 120. However, the placement of the one or more motion sensors is not limited to the aforementioned position, it can be any place in second part 120.

The motion sensor may be integrated into the motherboard of the portable device or circuitry of the first part 110 or second part 120. Alternatively, the motion sensor may also be placed externally with respect to the enclosure (e.g., either second part 120 or first part 110) of the portable device. In such circumstance, the motion sensor may be equipped as a module of a Raspberry Pi® that communicatively coupled to the laptop via any I/O interface (e.g., Universal Serial Bus (USB)) or preferably has wireless connectivity (e.g., Bluetooth™, WiFi) for data transmission. Other similar forms of embedded devices are possible.

Figure 8:
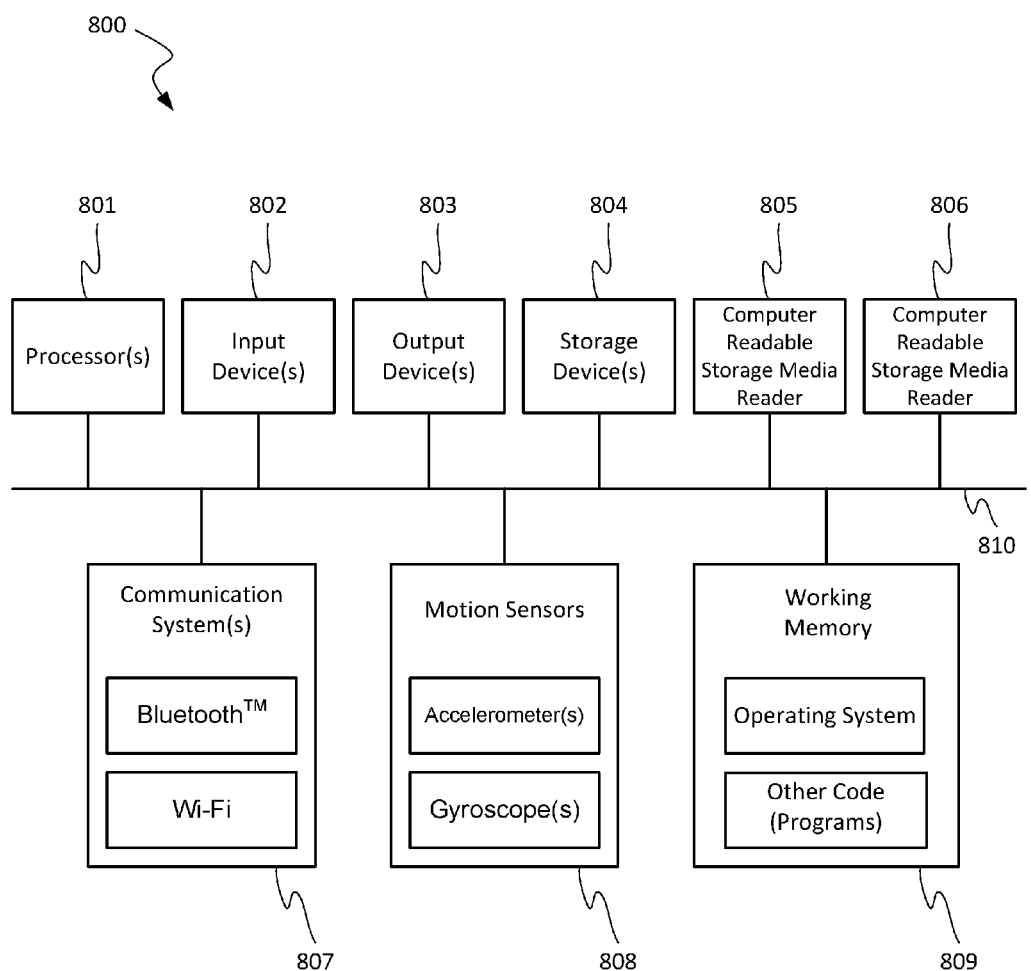
FIG. 8 illustrates a hardware configuration of the portable device according to a third embodiment of the invention.

FIG. 8 is a block diagram 800 illustrating a hardware configuration including therein the portable device in accordance with an embodiment of the present disclosure. Referring to FIG. 8, the portable device may include, but not limited to, a bus 810, at least one processor 801, at least one input device 802, at least one output device 803, at least one storage device 804, at least one computer readable storage media reader 805, an eye tracker 806, a communication system 807 equipped with at least Bluetooth and/or WiFi connectivity, at least two motion sensors 808 (either accelerometer(s) and/or gyroscope(s)) and working memory 809 storing operating system and other codes or programs.

Figure 9:
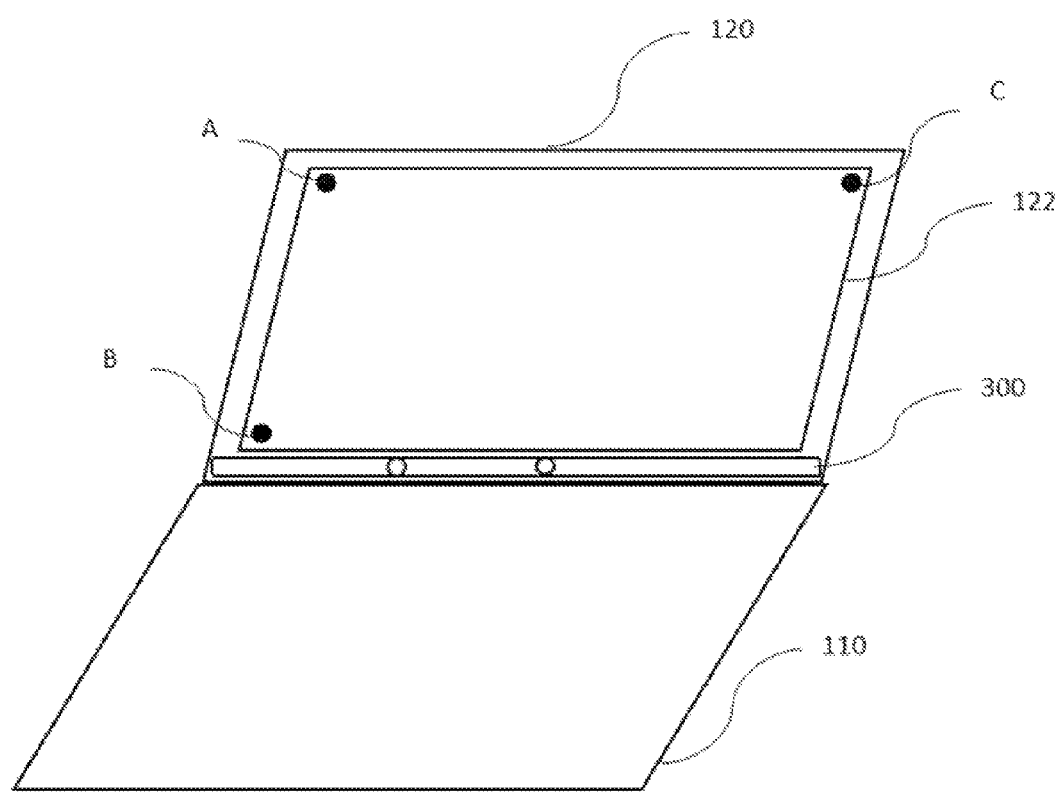
FIG. 9 illustrates a front view of the display unit of the portable devices according to a third embodiment of the invention.

In a non-limiting example, as shown in FIG. 7, under the control of the processor, the motion sensor 401 in the first part 110 acquires a first angle value ($V_{base}$) and the motion sensor 402 in the second part 120 acquires a second angle value ($V_{lid}$). The acquisition of the angle values for either first part 110 and the lid element may be in the form of asynchronization or synchronization in real time, or in a periodic form for designated or predetermined time intervals. The first angle value ($V_{base}$) and the second angle value ($V_{lid}$) is transmitted to the processor. Then the open angle value ($V_{close\ up}$), between the surface of the first part 110 and the surface of the second part 120, is calculated in the processor by using a first angle value ($V_{base}$) and the second angle value (Vlid). After the calculation of the open angle value ($V_{close\ up}$), the 3D coordinates value (position in the 3D space) of at least three points on the surface of the second part 120, with respect to a predetermined position at the bottom of the display unit 122 that substantially closed to the position of the camera of the eye tracker, are calculated by the processor (based at least in part on the data from the motion sensors). Alternatively, the predetermined position can be specified by the user. The calculation of the 3D coordinates value is based on the acquired the first angle value ($V_{base}$), the second angle value ($V_{lid}$), the open angle value ($V_{close\ up}$) and the pre-known dimension information of the display unit 122. Alternatively, the dimension information may be specified by the user. As shown in the FIG. 9, It is advantageous that aforementioned three or more points should include at least two points that substantially close to the top right corner (shown as C in FIG. 9) of the display unit 122 and the top left corner (shown as A in FIG. 9) of the display unit 122 respectively, and at least one point that is substantially closed to the lower left corner (shown as B in FIG. 9) or lower right corner of the display unit 122. "Substantially close" in this context may mean proximate to such positions, and/or the most extreme corners of the visible-to-the-user portion of the display unit. Preferably, the distance between each of those three points should be as large as possible.

Then a final motion information is determined in the processor via arithmetic calculation by using the $V_{close\ up}$ and the 3D coordinates' values of the at least three points. Optionally, the final motion information may be determined by only using either of the $V_{close\ up}$ or the 3D coordinates' values of the at least three points. The final motion information is sent to the eye tracker. Alternatively, the final motion information may be determined before ahead if it is within a predetermined threshold value. The predetermined threshold value may indicate a range of open angle value. In an extreme circumstance that the open angle of the laptop or the twisting angle of the second part 120 may be too large to be used for the use of gaze determination (will be described in the following). After the acquisition of the final motion information, eye tracker is controlled to determine the user's gaze positions of at least one eye relative to the display unit 122. Besides, the eye tracker may also alternatively determine the head pose of the user with respect to the display unit 122 and take the head pose information into account of determination of gaze positions. Here, head pose may be determined based on one or more images captured by the optical remote sensing. The head pose may be defined by the position and the orientation of the head in three-dimensional space at some particular time. The head pose may be determined by examining one or more facial features (for instance mouth, nose, etc.) and their positions and orientations relative to one another. In non-limiting determination condition, under the control of the processor, the eye tracker is controlled to (a) determine if the gaze positions cannot be determined at all with respect to the display unit 122; or (b) determine if the gaze positions cannot be determined in a predetermined area with respect to the display unit 122 (e.g., corner of the display unit, or area that is close to the edge of the display unit 122). Note that "gaze position" is used herein to not only describe actual determined gaze positions, but also may include a description of a scenario where the gaze position cannot be determined with respect to the display unit 122 or otherwise.

If the result of the aforementioned determination is positive, then the eye tracker is controlled for the following one or both of the executions: (i the eye tracker may be power ON or OFF or pause the eye tracker for image collection or adjust one or more photography parameters (e.g., frame rate, exposure, ISO and etc.) for image collection or start over the calibration process of the eye tracker; (ii) one or more system events associated with the eye tracker may be controlled, such as the function of the application on the portable device. Other executions are possible, not limited to the aforementioned executions.

Figure 10:
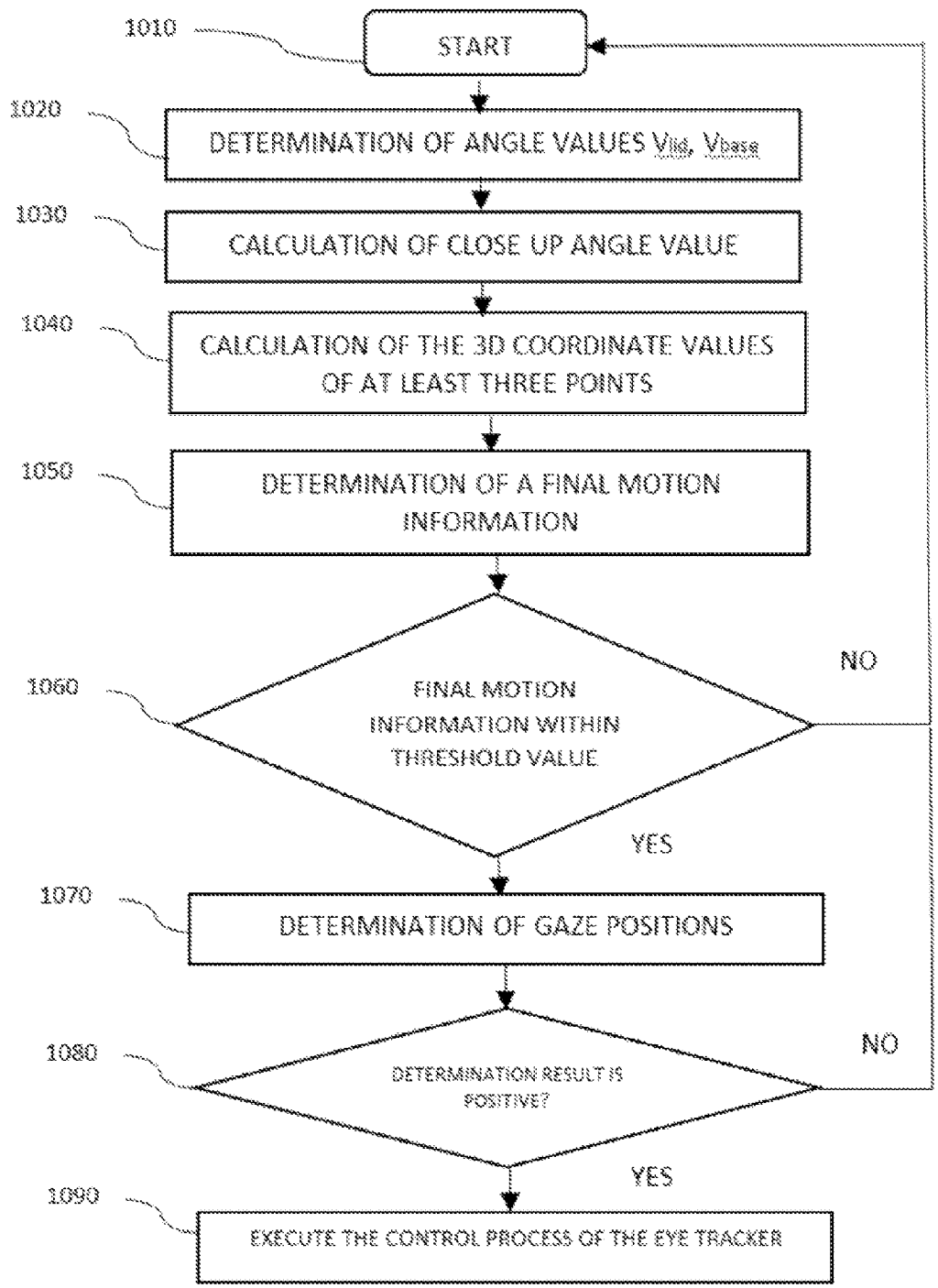
FIG. 10 illustrates a flow chart describing a processing procedure according to a third embodiment of the invention.

Next, referring to the flowchart of FIG. 10, a processing procedure according to the third embodiment of the invention. At step 1010, the portable device starts the process. At step 1020, the motion sensor in the first part 110 and the second part 120 are controlled to determine angle value $V_{lid}$, $V_{base}$ respectively. At step 1030, the open angle value of the portable device is calculated based on the determined two angle values $V_{lid}$, $V_{base}$ at step 1020.

At step 1040, the 3D coordinate values of three or more points on the display unit 122 are calculated in the processor. At step 1050, a final motion information is determined by using calculated the 3D coordinate values and the open angle value. At step 1060, after the determination of the final information, the final information is further determined whether it is within the threshold value. If the final motion information is within threshold value, then proceeds to step 1070; if the final motion information is not within the threshold value.

At step 1070, the eye tracker is controlled to determine gaze positions of the user with respect to the display unit 122. At step 1080, the gaze positions are used to (a) determine if the gaze positions cannot be determined at all with respect to the display unit 122; or (b) determine if the gaze positions cannot be determined in a predetermined area with respect to the display unit 122 (e.g., corner of the display unit, or area that closed to the edge of the display unit 122. And if the determination result is position. If the determination result is negative. At step 1090, the eye tracker is controlled to execute corresponding control process.

Embodiments of the invention has now been described in detail for the purposes of clarity and understanding. However, it will be appreciated that certain changes and modifications may be practiced within the scope of the appended claims.

What is claimed is:

1. A portable computing device, comprising:
   a base element;
   a lid element including a display and rotatably coupled with the base element, such that an angle between the base element and the lid element is capable of being varied;
   a first motion sensor disposed in the base element;
   a second motion sensor disposed in the lid element;
   a processor configured to:
      receive information from the first motion sensor;
      receive information from the second motion sensor; and
      determine the angle between the base element and the lid element, based at least in part on the information from the first motion sensor and the information from the second motion sensor; and
   an eye tracking system configured to determine a gaze position of a user relative to the display based at least in part on the angle between the base element and the lid element.

2. The portable computing device according to claim 1, wherein:
   the information from the first motion sensor comprises a first angle value between the gravitational force exerted by the Earth and a plane of the base element; and
   the information from the second motion sensor comprises a second angle value between the gravitational force exerted by the Earth and a plane of the lid element.

3. The portable computing device according to claim 1, wherein the first motion sensor and the second motion sensor each comprise an accelerometer.

4. The portable computing device according to claim 3, wherein the second motion sensor is located below the display and proximate to a hinge means rotatably coupling the base element with the lid element.

5. The portable computing device according to claim 1, wherein:

the processor is further configured to execute one or more control processes based at least in part on the gaze position meeting a predetermined condition, wherein the one or more control processes include a selection from a group consisting of:
turning off the eye tracking system;
pausing image collection by the eye tracking system;
adjusting one or more photography parameters of the eye tracking system; and
controlling one or more system events.

6. The portable computing device according to claim 5, wherein the predetermined condition is selected from a group consisting of:
the gaze position cannot be determined; and
the gaze position is not within a predetermined area with respect to the display.

7. The portable computing device according to claim 6, wherein the predetermined area is smaller than an entirety of the display.

8. The portable computing device according to claim 1, wherein the processor is further configured to determine 3D coordinate values of three or more positions on the display based at least in part on at least one of the information from the first motion sensor, the information from the second motion sensor, or the angle between the base element and the lid element.

9. The portable computing device according to claim 8, wherein the three or more positions include:
at least one position proximate to a top right corner of the display;
at least one position proximate to a top left corner of the display; and
at least one position proximate to a lower left corner or a lower right corner of the display.

10. The portable computing device according to claim 1, wherein the eye tracking system is further configured to determine head pose information of the user with respect to the display.

11. The portable computing device according to claim 10, wherein the eye tracking system is further configured to determine the gaze position based on the head pose information.

12. A method comprising:
detecting first motion information with at least a first motion sensor disposed in a first part of a portable device;
detecting second motion information with at least a second motion sensor disposed in a second part of the portable device, wherein the second part is rotatably coupled with the first part such that an angle between the first part and the second part is capable of being varied;
determining the angle between the first part and the second part, based on the first motion information and the second motion information;
determining a gaze position of a user based at least in part on information from an eye tracking system and the angle; and
executing one or more control processes based at least in part on the gaze position meeting a predetermined condition.

13. The method of claim 12, wherein:
the first part comprises a base element; and
the second part comprises a lid element.

14. The method of claim 13, wherein:
the first motion information comprises a first angle value between the gravitational force exerted by the Earth and a plane of the base element; and
the second motion information comprises a second angle value between the gravitational force exerted by the Earth and a plane of the lid element.

15. The method of claim 13, wherein the second motion sensor is located below a display of the lid element and proximate to a hinge means rotatably coupling the base element with the lid element.

16. The method of claim 13, wherein the predetermined condition is selected from a group consisting of:
the gaze position cannot be determined; and
the gaze position is not within a predetermined area with respect to a display of the lid element.

17. The method of claim 16, wherein the predetermined area is smaller than an entirety of the display.

18. The method of claim 13, wherein the method further comprises:
determining 3D coordinate values of three or more positions on a display of the lid element based at least in part on at least one of the first motion information, the second motion information, or the angle between the first part and the second part.

19. The method of claim 18, wherein the three or more positions includes at least one proximate to a top right corner of the display, at least one proximate to a top left corner of the display, and at least one proximate to the lower right or left corner of the display.

20. The method of claim 13, wherein the method further comprises:
determining head pose information of the user with respect to a display of the lid element.

21. The method of claim 20, wherein the gaze position is further based on the head pose information.

22. The method of claim 12, wherein the first motion sensor and the second motion sensor each comprise an accelerometer.

23. The method of claim 12, wherein the one or more control processes include a selection from a group consisting of:
turning off the eye tracking system;
pausing image collection by the eye tracking system;
adjusting one or more photography parameters of the eye tracking system; and
controlling one or more system events.

24. A non-transitory computer readable medium having stored thereon a program comprising the steps of:
detecting first motion information with at least a first motion sensor disposed in a first part of a portable device;
detecting second motion information with at least a second motion sensor disposed in a second part of the portable device, wherein the second part is rotatably coupled with the first part such that an angle between the first part and the second part is capable of being varied;
determining final motion information based on the first motion information and the second motion information, wherein the final motion information comprises an angle between the first part and the second part; and
determining a gaze position of a user based on at least in part of the final motion information.

25. The non-transitory computer readable medium of claim 24, wherein:
the first part comprises a base element; and
the second part comprises a lid element.

* * * * *